(12) United States Patent
Rogers (10) Patent No.: US 8,408,384 B2
(45) Date of Patent: Apr. 2, 2013

(54) CONVEYOR ASSEMBLY WITH SELECTIVELY MOVABLE ZONES

(75) Inventor: Don A. Rogers, Fredericktown, OH (US)

(73) Assignee: Unique Metal Designs, Inc., Fredericktown, OH (US)

( * ) Notice: Subject to any disclaimer, the term of this patent is extended or adjusted under 35 U.S.C. 154(b) by 43 days.

(21) Appl. No.: 13/217,441

(22) Filed: Aug. 25, 2011

(65) Prior Publication Data

US 2013/0048469 A1    Feb. 28, 2013

(51) Int. Cl.
    *B65G 13/06*      (2006.01)
(52) U.S. Cl. ............. 198/781.08; 198/781.03; 193/35 A
(58) Field of Classification Search ............... 198/463.3, 198/345.3, 781.03, 781.04, 781.08, 781.09, 198/790; 193/35 A
See application file for complete search history.

(56) References Cited

U.S. PATENT DOCUMENTS

| | | | | |
|---|---|---|---|---|
| 4,238,026 A | * | 12/1980 | Mrugala et al. ............ | 198/460.1 |
| 4,392,568 A | * | 7/1983 | Turnbough et al. ...... | 198/781.06 |
| 4,473,149 A | * | 9/1984 | Vogt et al. ................ | 198/781.04 |
| 4,511,030 A | * | 4/1985 | Lem .............................. | 198/633 |
| 5,191,967 A | * | 3/1993 | Woltjer et al. ........... | 198/781.06 |
| 5,409,096 A | * | 4/1995 | Clopton ...................... | 193/35 A |
| 5,906,267 A | * | 5/1999 | Heit et al. ................ | 198/781.05 |
| 6,019,211 A | * | 2/2000 | Masciarelli, Jr. .......... | 198/345.3 |
| 6,814,222 B2 | * | 11/2004 | Henson et al. ........... | 198/781.06 |
| 6,966,416 B2 | * | 11/2005 | Walker ........................ | 193/35 A |

* cited by examiner

*Primary Examiner* — James R Bidwell
(74) *Attorney, Agent, or Firm* — Mueller Law, LLC; Jerry K. Mueller, Jr.

(57) ABSTRACT

A conveyor assembly includes a series of rollers for conveying a product to one or more product operations. A pair of spaced apart side frames support the series of rollers spanning between the frames. A drive system is associated with one or more rollers of the series of rollers and includes a selectively inflatable bladder, an elastomeric sleeve and a moving belt, wherein inflation of the bladder pushes the moving belt against one or more of the rollers for their rotation. A brake system is associated with one or more of the series of rollers and includes a selectively inflatable bladder and a fixed elastomeric band, wherein inflation of the bladder pushes the fixed elastomeric band against one or more of the rollers for stopping its rotation.

15 Claims, 13 Drawing Sheets

CONVEYOR ASSEMBLY WITH SELECTIVELY MOVABLE ZONES

CROSS-REFERENCE TO RELATED APPLICATIONS

None.

STATEMENT REGARDING FEDERALLY SPONSORED RESEARCH

Not applicable.

BACKGROUND

The present disclosure generally relates to conveyor assemblies and more particularly to conveyor assemblies for vehicle tires.

A typical transportation mode for product, such as, for example, green and finished vehicle tires, within a plant utilizes conveyors. Conveyors can be powered or they can rely on gravity when sufficient pitch is present to keep the tires moving from a starting point to a destination.

When the operator desires to transfer, for example, a set of 4 tires from a feed conveyor to a destination conveyor, the operator is presented with a problem if the current conveyor contains many sets of tires. The conveyor must be controlled so as to deliver only one set of tires at a time to the destination conveyor while accumulating the remaining tire sets on the feed conveyor.

It is to such a feed conveyor that the present disclosure is directed.

BRIEF SUMMARY

A conveyor assembly includes a series of rollers for conveying a product to one or more product operations. A pair of spaced apart side frames support the series of rollers spanning between said the frames. A drive system is associated with one or more rollers of the series of rollers and includes a selectively inflatable bladder, an elastomeric sleeve and a moving belt, wherein inflation of the bladder pushes the moving belt against one or more of the rollers for their rotation. A brake system is associated with one or more of the series of rollers and includes a selectively inflatable bladder and a fixed elastomeric band, wherein inflation of the bladder pushes the fixed elastomeric band against one or more of the rollers for stopping its rotation.

This conveyor assembly and other aspects of thereof are delineated in greater detail below.

BRIEF DESCRIPTION OF THE DRAWINGS

For a fuller understanding of the nature and advantages of the present assembly and components thereof, reference should be had to the following detailed description taken in connection with the accompanying drawings, in which.

The drawings will be described in further detail below.

DETAILED DESCRIPTION

Figure 1:
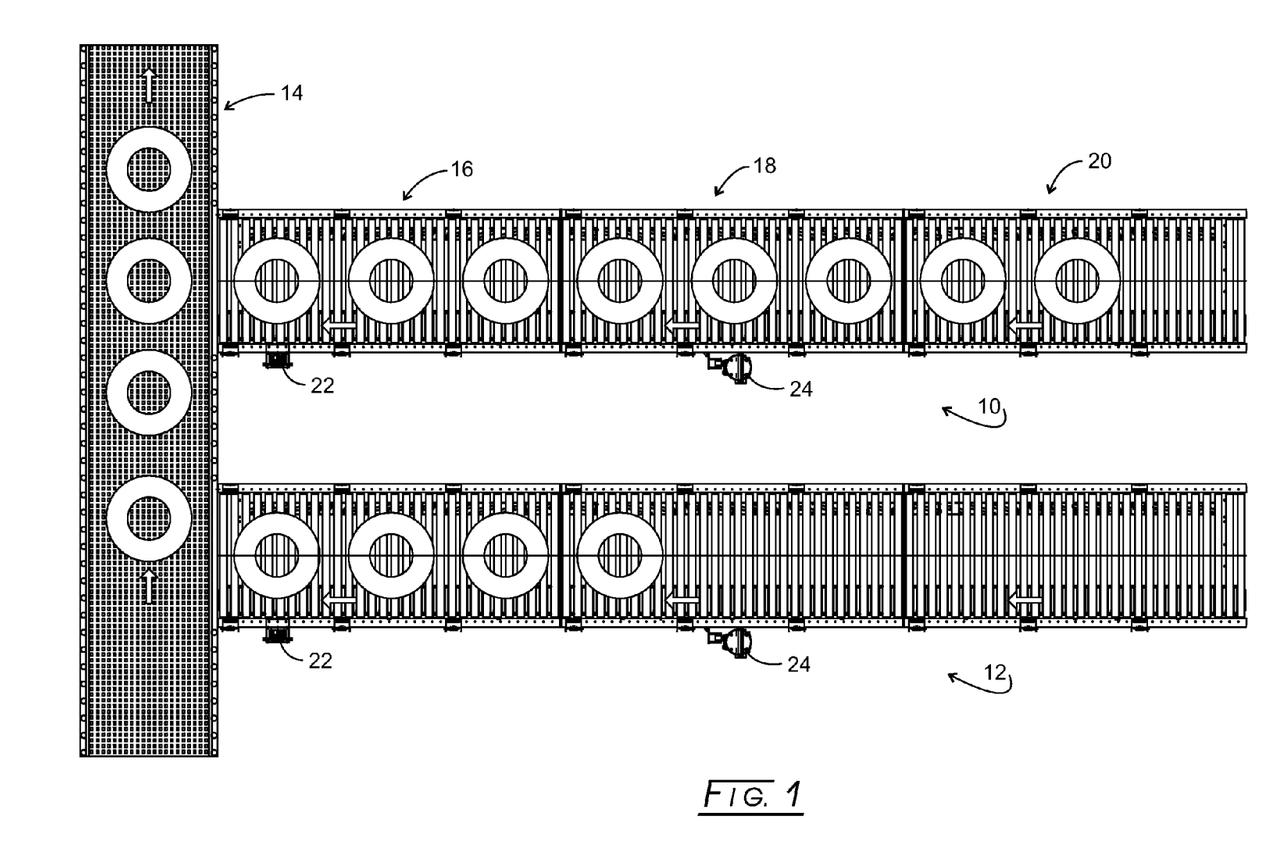
FIG. 1 is an overhead view of a tire assembly conveyor line that includes a pair of feed conveyors of the present disclosure, each feed conveyor composed of three sections, to with, a feed section, a drive section, and a discharge section, which feed conveyors move their tires or other cargo onto a single destination conveyor.

Referring specifically to FIG. 1, feed conveyors, 10 and 12, move tires onto a destination conveyor, 14. The tires may be the same on feed conveyors 10 and 12, or they may of a different size, grade, type, etc. The description herein will be of feed conveyor 10 by way of illustration only, as conveyor 12 will be of similar construction and operation. In fact, there could be many more of such feed conveyors associated with destination conveyor 14 or just a single feed conveyor, as is necessary, desirable, or convenient for the plant operator.

Feed conveyor 10 in turn is composed of 3 sections or zones: an exit section, 16, a drive section, 18, and an entrance section, 20. While each of these sections is shown bearing 2 or 3 tires, the number of tires filling each section could be lesser or great in number. In fact, additional sections (such as, for example, additional intermediate sections, see FIG. 11) could be added to feed conveyor 10 to extend its length. A controller, 22, is seen associated with exit section 16 and a drive assembly, 24, are seen associated with drive section 18. As shown in FIG. 1, each section is composed of 3 zones; although, the number of zones within each section could be greater or lesser in number.

Figure 2:
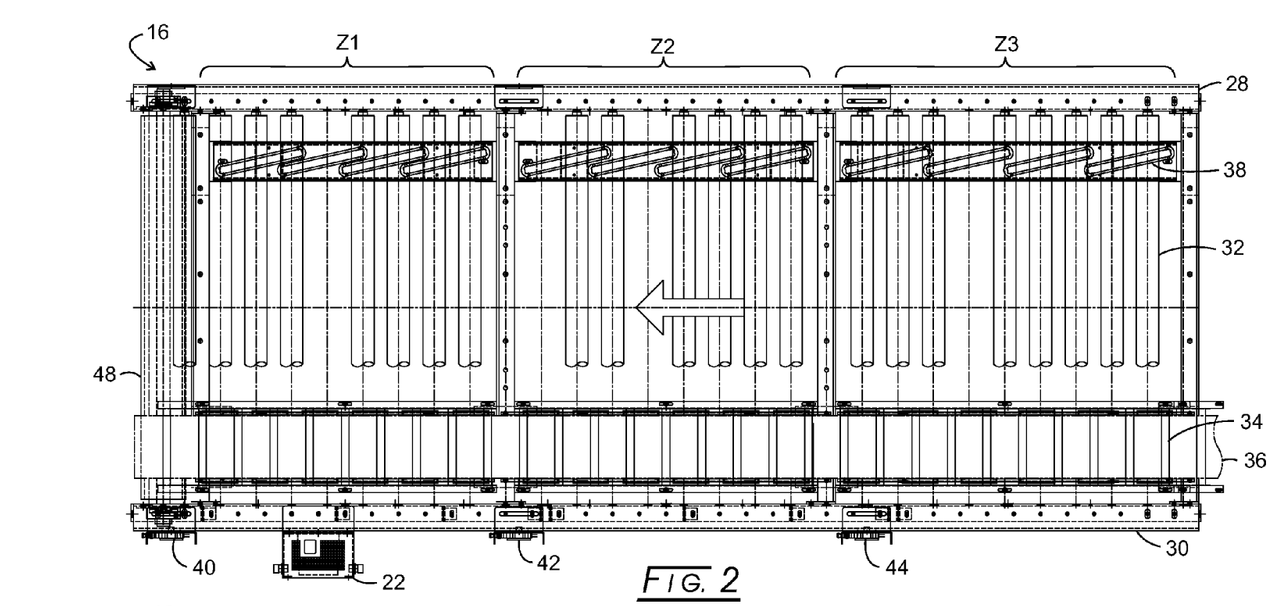
FIG. 2 is an overhead view of the exit section of one of the feed conveyors of FIG. 1.
Figure 3:
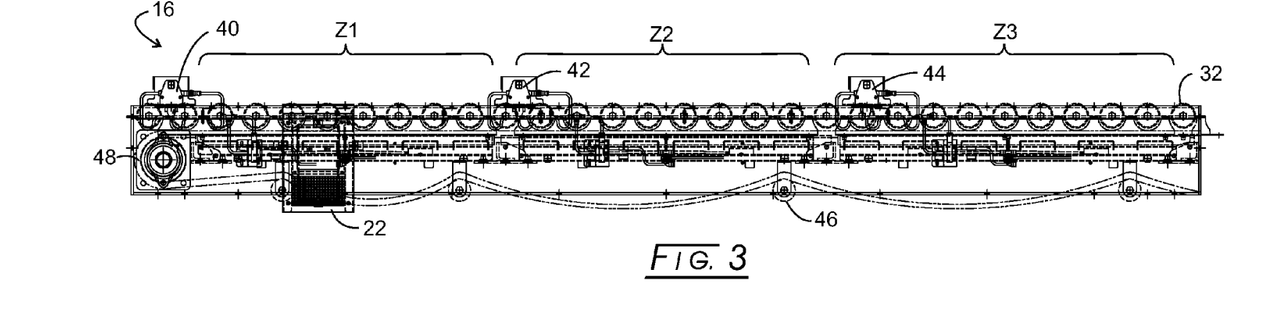
FIG. 3 is a side elevational view of the exit section depicted in FIG. 2 with the side frame broken away to reveal interior components of the conveyor.

Referring to FIGS. 2 and 3, exit section 16 is seen to be composed of 3 zones: Z1, Z2, and Z3. Exit section 16, like the other 2 sections, has a pair of spaced-apart side frame assemblies, 28 and 30, having a plurality of freely moving rollers, typified by rollers, 32 and 33, spanning between side frame assemblies 28 and 30. Adjacent to side frame assembly 30, are zone guards (see zone guard 34) disposed between each adjacent roller for protecting the operator. An endless belt, 36, runs parallel and adjacent to side frame assembly 30 for providing movement to the rollers, as will be explained in more detail later herein.

A braking system composed of elastomeric bands, such as typified by elastomeric band 38, are disposed adjacent to frame assembly 28. Their operation will be explained in greater detail below. A series of sensors, 40, 42, and 44, are used to sense the presence/absence of a tire of other article being present on exit section 16. In this fashion, controller 22 and/or the operator will know the number and location of tires or other articles being conveyed on exit section 16.

A series of rollers assemblies, such as a roller assembly, 46, carry belt 36 on its return with a return pulley assembly, 48, being located of the end of exit section 16. The drive system employing belt 36 will be described in more detail later herein. Product from exit section 16 moves onto destination conveyor 14 or other operations, as is necessary, desirable, or convenient.

Figure 4:
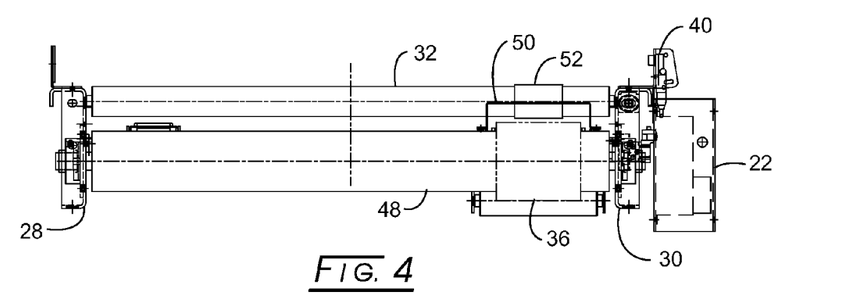
FIG. 4 is an end view of the exit section depicted in FIG. 2 looking from its destination end towards the feed conveyor.

Referring to FIG. 4, spaced-apart frames 28 and 30 are seen to retain end roller 32 therebetween. Pulley assembly 48 is seen between side frames 28 and 30. A guard, 50, is seen along with a drive elastomeric (or rubber) sleeve, 52. Again, the drive system will be explained in more detail below.

Figure 5:
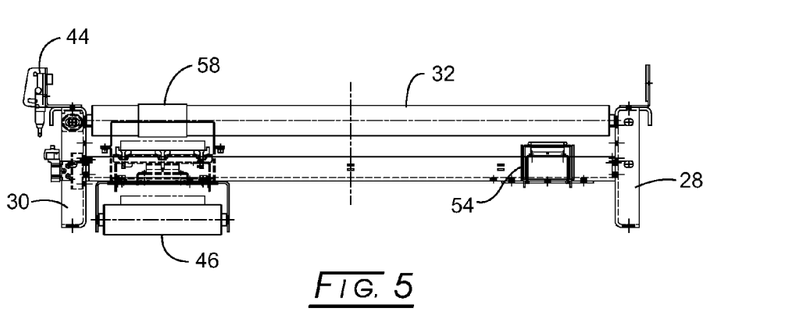
FIG. 5 is an end view of the exit section depicted in FIG. 2 looking from the feed conveyor towards the destination section's feed end.

Referring to FIG. 5, one of the brake assemblies, 54, is revealed adjacent to frame assembly 28. Again, the brake system will be explained in more detail below. It should be noted that another section of the drive system, 58, is seen adjacent to side frame assembly 30.

Figure 6:
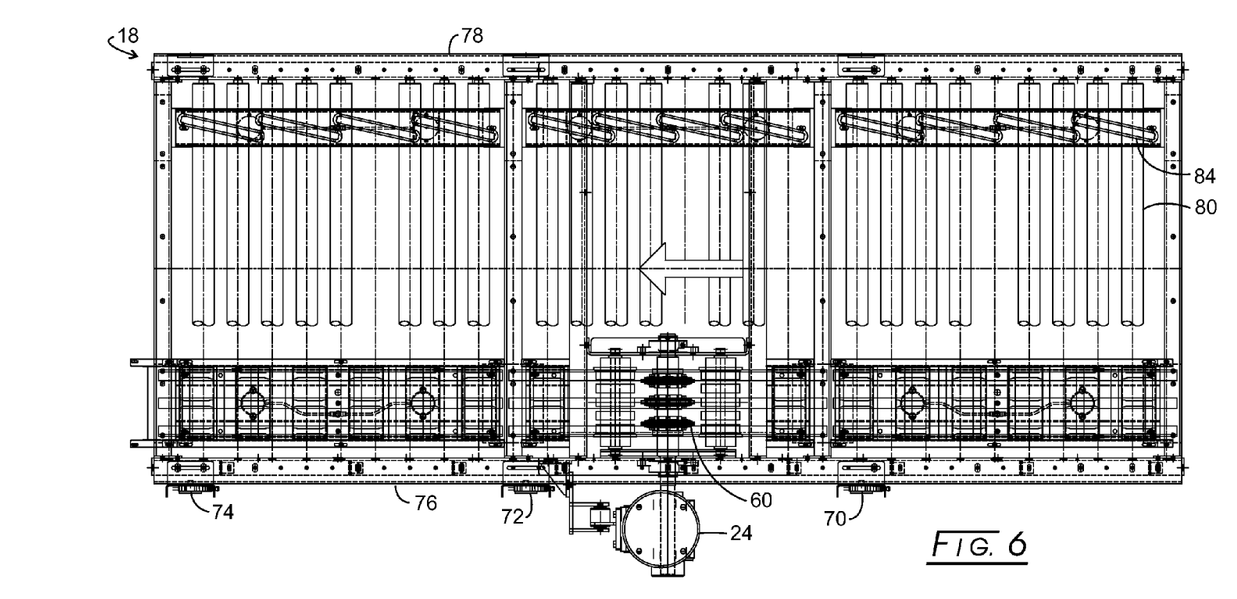
FIG. 6 is an overhead view like that shown in FIG. 2 with the drive belt and guards removed to view the drive system disposed therebeneath.
Figure 7:
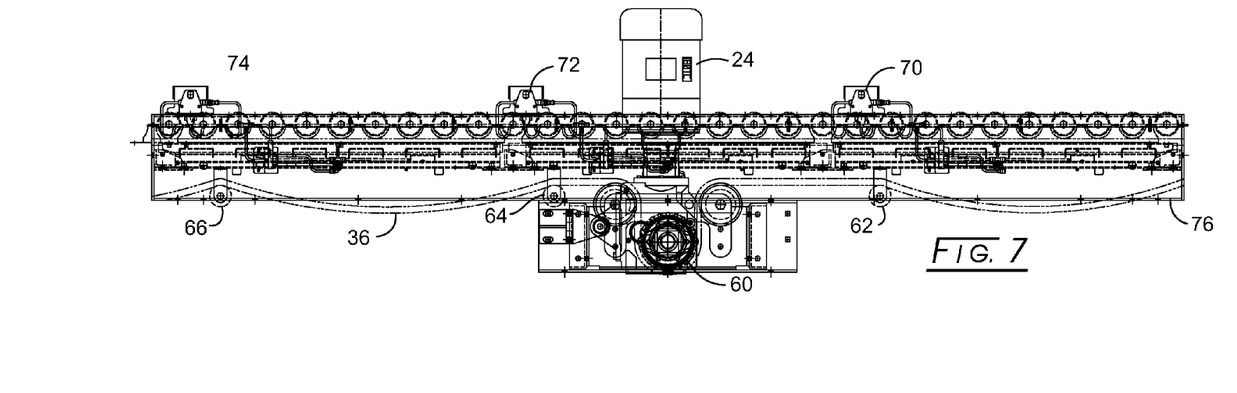
FIG. 7 is a side elevational view of the feed section depicted in FIG. 6 particularly showing the drive system.

Drive section 18 is shown in greater detail in FIGS. 6 and 7. In particular drive assembly 24 may include a motor powered by electricity, pneumatics, hydraulics, or other power source. In association with the motor is a drive sprocket assembly, 60, about which belt 36 wraps for powering (moving) belt 36. Belt 36 also moves over roller assemblies, 62-66, which provide additional support for belt 36. Sensors, 70-74, are seen in FIG. 7 and perform as described above (with belt and center of zone removed for clarity).

Side frame assemblies, 76 and 78, support all components of drive section 18. In particular, a series of freely moving rollers, typified by an end roller, 80, span between side frame assemblies 76 and 78. A braking system composed of elastomeric bands, such as typified by elastomeric band 84, are disposed adjacent to frame assembly 78. One such elastic band is associated with each roller, although some rollers may not be associated with such elastic braking band and the instant braking system still function in accordance with the precepts disclosed herein.

How selective movement and braking is applied to the series of rollers in drive section 18 will be described later herein.

Figure 8:
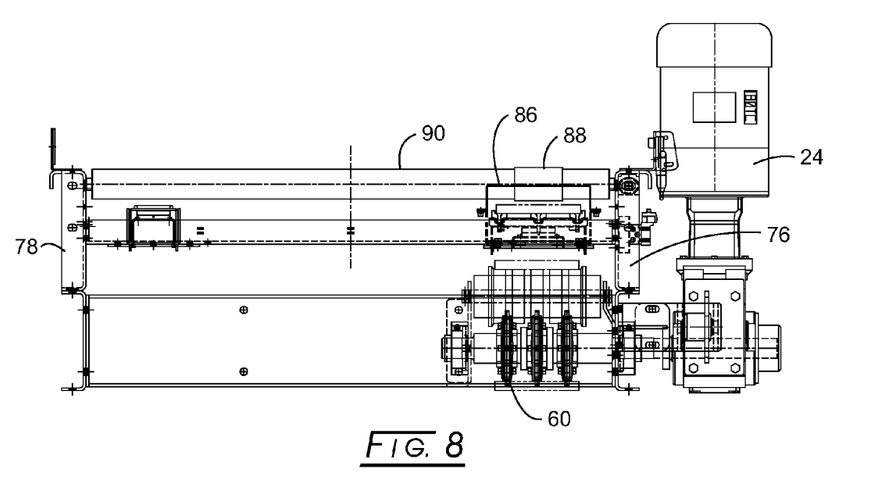
FIG. 8 is an end view of the drive section of the feed conveyor depicted in FIG. 1.

Referring now to cross-section FIG. 8, drive sprocket assembly 60 is seen in greater detail. A guard, 86, is seen along with a drive elastomeric sleeve, 88, which is associated with a roller, 90. Again, the drive system will be explained in more detail below.

Figure 9:
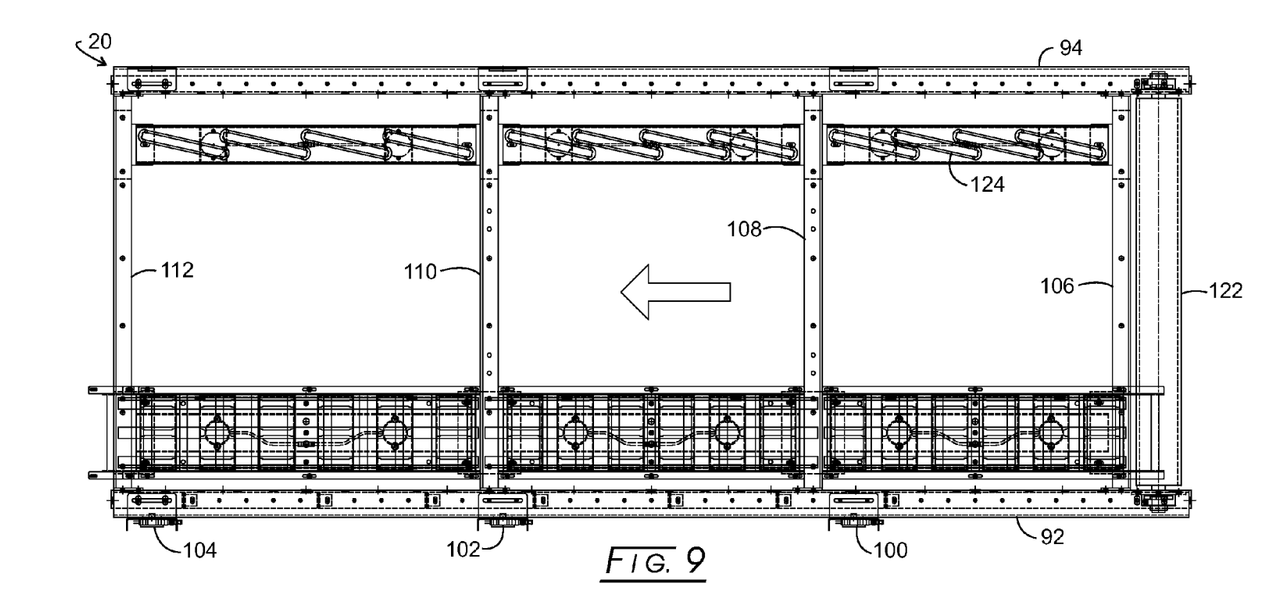
FIG. 9 is an overhead view like that shown in FIG. 4 (opposite orientation) with the drive belt and guards removed to view the drive system disposed therebeneath.
Figure 10:
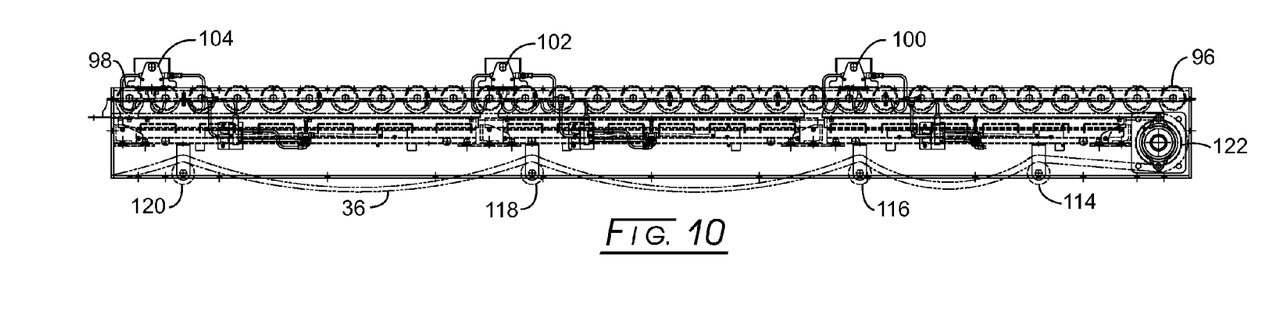
FIG. 10 is a side elevational view of the entrance section depicted in FIG. 9 particularly showing the drive system.

FIGS. 9 and 10 show entrance section 20, which again is composed of 3 zones. The rollers have not been shown in FIG. 9 in order to better view the belt drive and braking systems. In particular, a pair of side frame assemblies, 92 and 94, have rollers laterally spanning therebetween, as typified in FIG. 10 by end rollers, 96 and 98. Sensors, 100, 102, and 104, sense the presence of tires or other goods traveling on the disclosed conveyor system. Laterally spanning braces, 106, 108, 110, and 112, connect side frame assemblies 92 and 94. Such laterally spanning braces also are used to connect the side frame assemblies in sections 16 and 18, described above.

Belt 36 runs around and is supported by roller assemblies, 114-120, and returning by a pulley assembly, 122. Elastic bands, as typified by elastic band, 124, are associated with the rollers for braking (stopping rotation) the rollers. A drive engagement system also selectively commences rotation of the rollers for conveying tires or other products, and will be described in more detail below.

Figure 11:
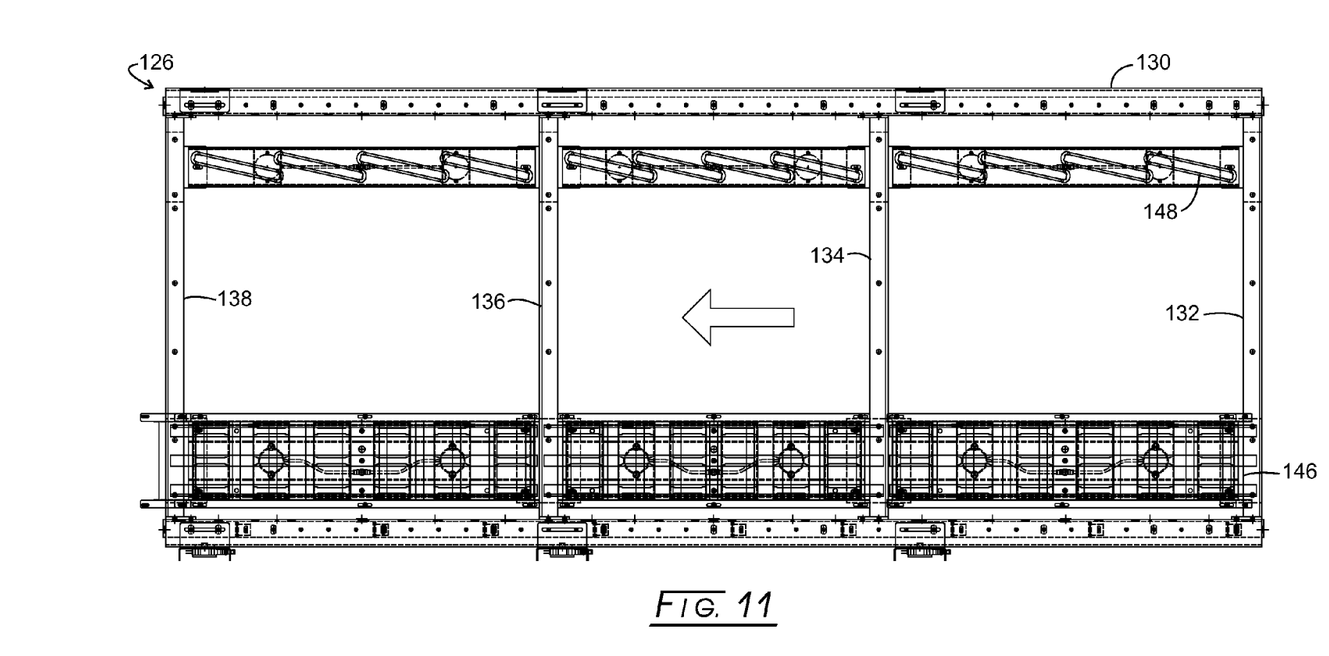
FIG. 11 is an overhead view of the intermediate section of the feed conveyor of FIG. 1 with the drive unit, drive belt and guards removed to view the drive system disposed therebeneath.
Figure 12:
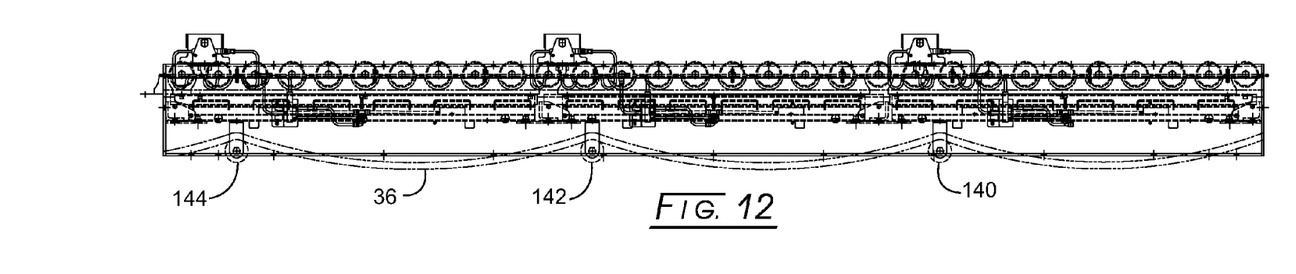
FIG. 12 is a side elevational view of the intermediate section of FIG. 11.

In some instances, it may be necessary to accumulate more tires or other product than can be handled by feed conveyors 10 or 12. In such instance, additional conveyor sections can be added thereto. An illustrative such additional conveyor section is illustrated in FIGS. 11 and 12. In particular, a conveyor section, 126, is again composed of 3 zones, as described above in connection with exit section 16, a drive section 18, and entrance section 20. As before, conveyor section 126 has a pair of spaced-apart side frame assemblies, 128 and 130, interconnected by lateral braces, 132-138. Belt 36 runs over roller assemblies, 140-144. Zone guards (e.g., zone guard 146) for each zone between each roller also are present, as before. Elastic bands, such as an elastic band, 148, are associated with the rollers as part of the braking systems. The selective drive system again will be described below (rollers removed for clarity).

One of the roller drive systems, 151, is illustrated in FIGS. 13 and 15-18. In particular, a drive roller, 150, is associated with an elastomeric (rubber) sleeve, 152, and has a zone guard, 154, adjacent to it for protection of the operator or other plant personnel. Belt 36 runs underneath roller 150. Belt 36 also runs over a return roller assembly, 156, underneath on its return. Side frame assembly 76 supports a laterally extending brace, 158. Belt 36 is supported by a slide bar assembly, 160, such as is described in commonly-owned U.S. Pat. No. 7,757,840. Underneath, slide bar assembly 160 is an inverted open-ended cover, 162, having end tangs, 164 and 166, that penetrate though a lower holder, 168, that mates with a zone guard, 154, that encases the drive assembly. Both sets of tangs move up and down with the inflation/deflation of bladder 174 and hold this assembly in place.

Figure 13:
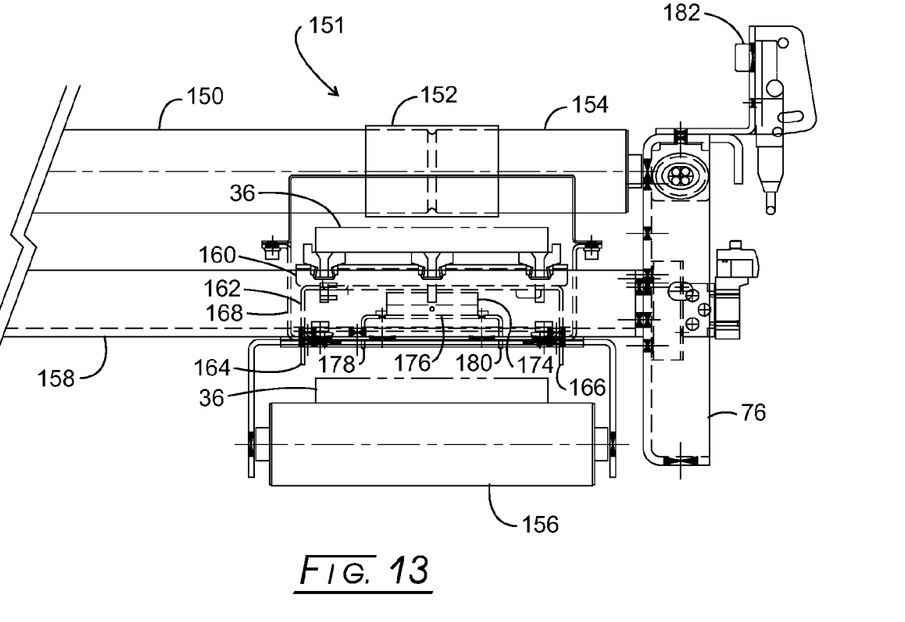
FIG. 13 is a sectional end view showing the drive system carried by the drive section of the feed conveyor of FIG. 1.
Figure 14:
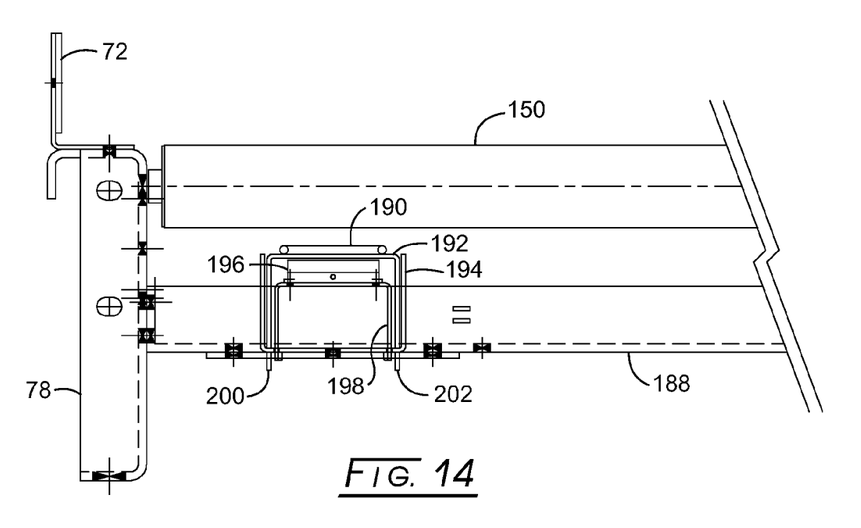
FIG. 14 is a sectional end view showing the braking system of the feed conveyor of FIG. 1.
Figure 15:
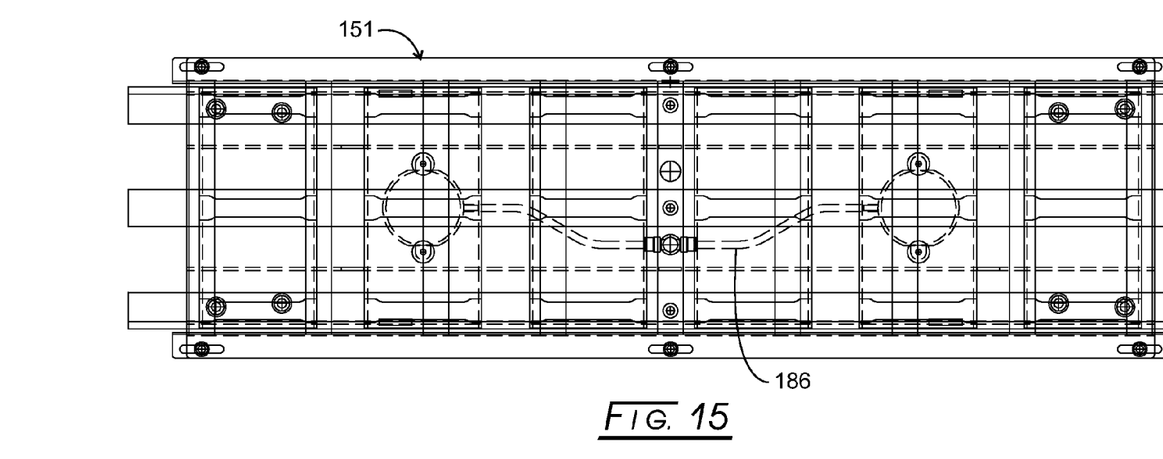
FIG. 15 is an overhead view of the drive system of FIG. 13 showing more of its detailed construction.
Figure 16:
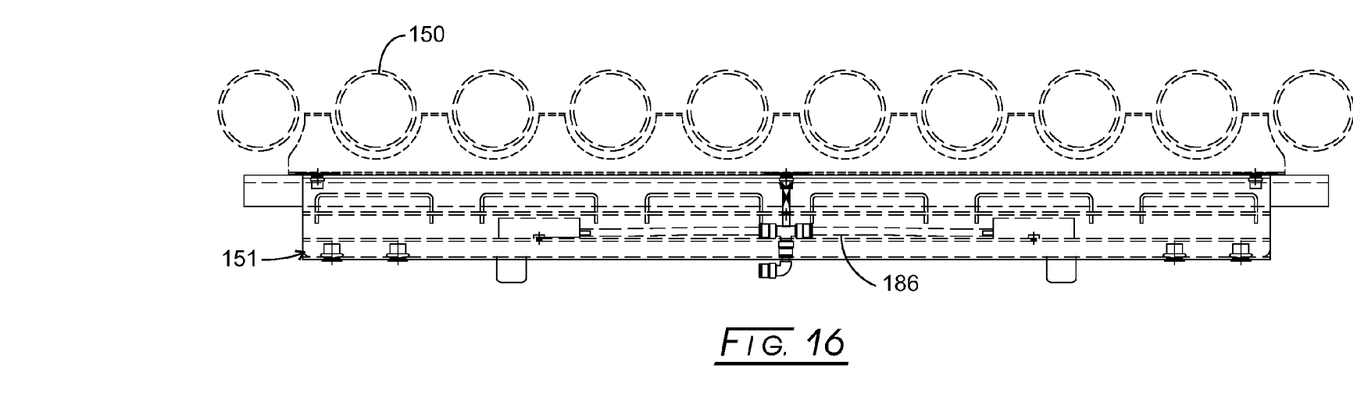
FIG. 16 is a side view of the drive system of FIG. 15.

Disposed beneath cover 162 is an inflatable bladder, 174, that sits atop another inverted open-ended cover, 176, that having end tangs, 178 and 180, that penetrate through lower holder 168. A pneumatic assembly, 182, includes a solenoid valve, pressure regulator, and piping for supplying air to inflatable bladder 174. It will be observed further that two such assemblies as illustrate in FIG. 13 are present at either end of each section 16, 18, and 20, as seen in FIG. 15, to with, drive system 151, and a second drive system, 184. Note that a hose, 186, connects both drive assemblies so that they operate in unison.

Figure 17:
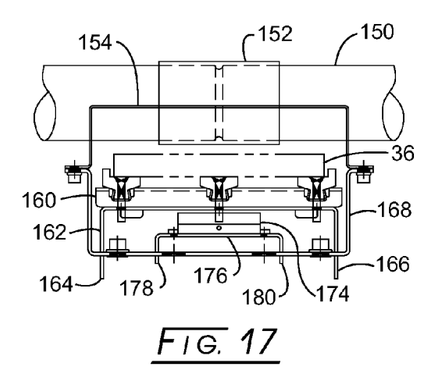
FIG. 17 is a sectional end view of the drive system of FIG. 13 at rest (not engaged)
Figure 18:
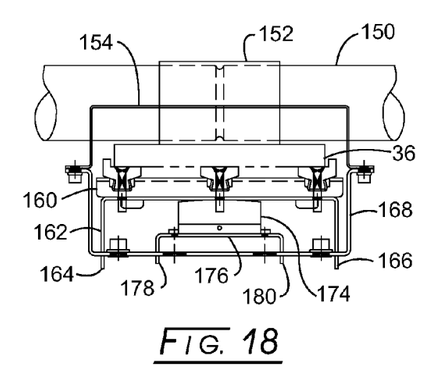
FIG. 18 is a sectional end view of the drive system of FIG. 13 engaged (power applied to rotate one or more rollers)

FIG. 17 illustrates the bladder at rest, i.e., uninflated so that roller 150 is at rest. In FIG. 18, bladder 174 has been inflated, causing belt 36 to push against elastomeric (rubber) sleeve 152 and, thus, cause rotation of roller 150 and consequent movement of tires of other objects sitting atop roller 150. Of course, the pair of bladders push against several rollers each for urging movement of the tires along the entire extent of the section of interest. The number of rollers activated will depend on the zone length and/or roller spacing.

One of the braking systems is illustrated in FIGS. 14 and 19-22. In particular, roller 150 is seen mounted into side frame 78 along with a spanning brace, 188, similarly mounted into side frame 78. The braking system includes a fixed elastic band, 190, disposed beneath roller 150, inverted open-ended cover, 192, that is contained within an open-ended cover, 194. An inflatable bladder, 196, is disposed within cover 194, and is disposed above a pair of bladder contacting supports, 198 and 199. Cover 190 has a pair of end tangs, 200 and 202, that movably penetrate through cover 194 (see FIGS. 21 and 22). Inflation of bladder 196 causes fixed elastic band 190 to push up against roller 150 and quickly stop it from moving (spinning) and, hence, stop movement of any items disposed atop roller 150.

Figure 19:
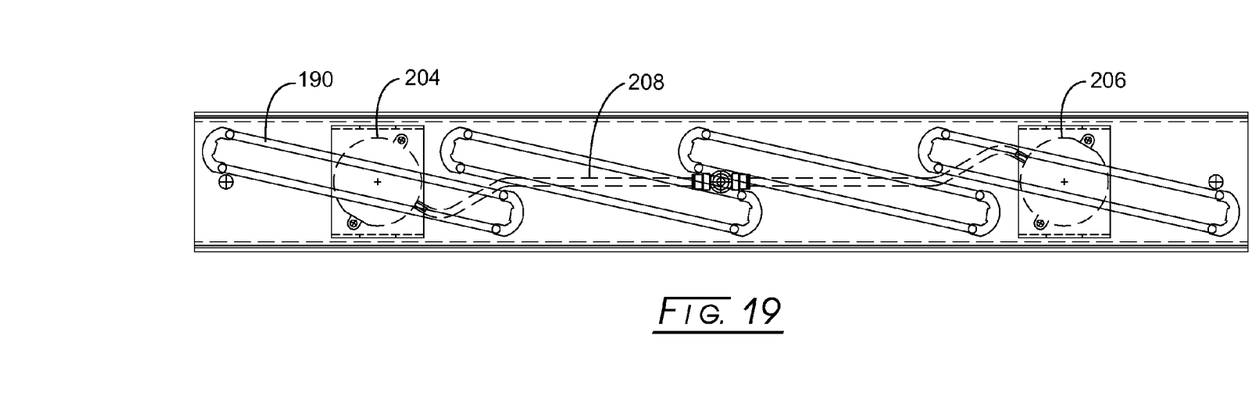
FIG. 19 is an overhead view of the braking system of FIG. 14 showing details of the hose, bladder, and elastomer bands.
Figure 20:
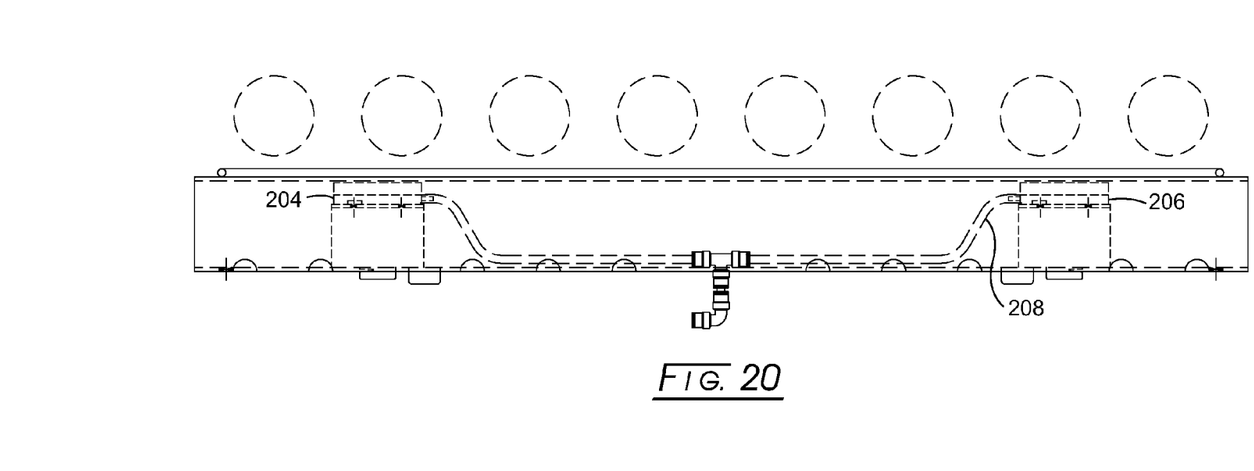
FIG. 20 is a side elevational view of the brake system of FIG. 19.
Figure 21:
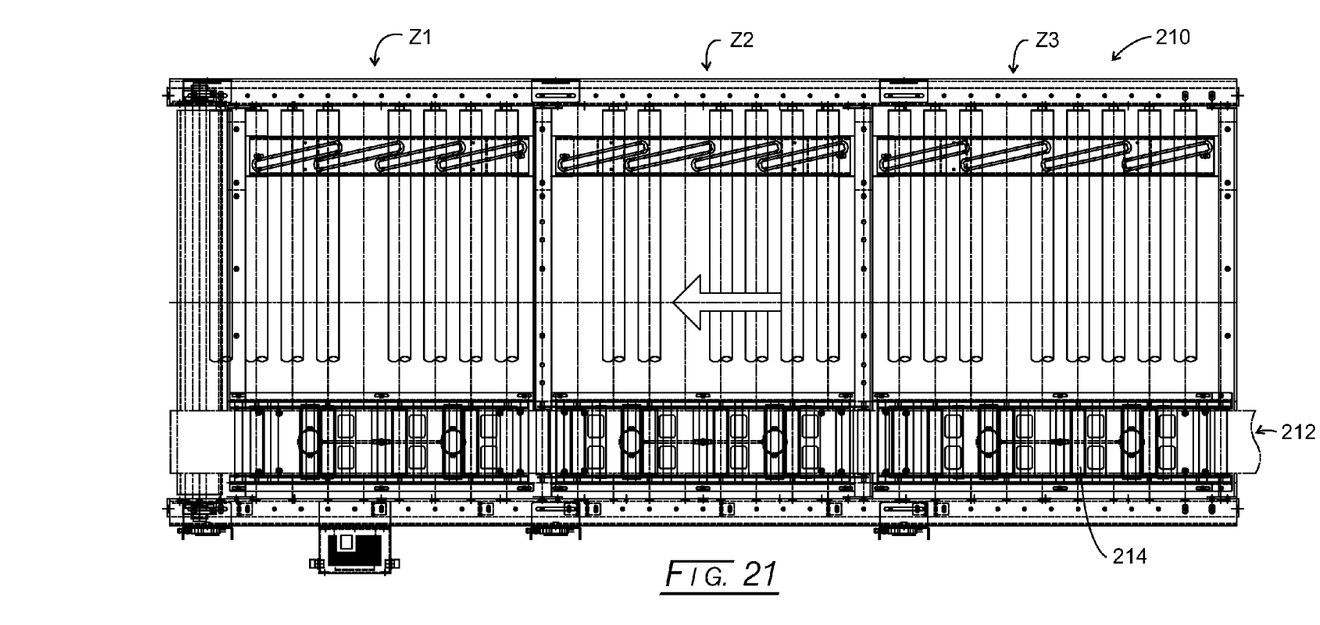
FIG. 21 is an overhead view of the exit section of one of the feed conveyors of FIG. 1, but with an alternative drive system.

Referring now more particularly to FIGS. 19 and 20, a pair of spaced apart brake systems, 204 and 206, are seen interconnected by a hose, 208, causing the simultaneous application of both braking systems to the section or zone of interest. As with the drive systems, a pneumatic system of an air supply, pressure regulator, solenoid valve, hosing, and the like, is connected to the braking systems for their operation.

Figure 22:
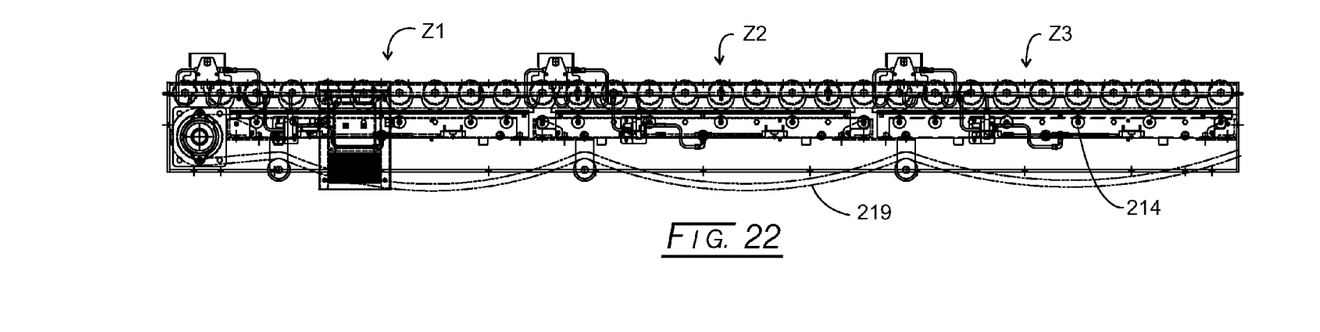
FIG. 22 is a side elevational view of the exit section depicted in FIG. 21 with the side frame broken away to reveal interior components of the conveyor alternative drive system.
Figure 23:
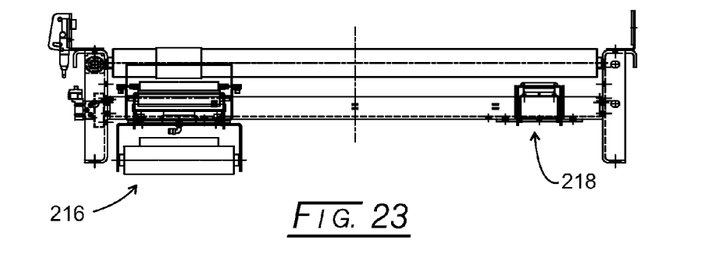
FIG. 23 is an end view of the exit section depicted in FIG. 21 looking from its destination end towards the feed conveyor.

An alternative drive system is illustrated in FIGS. 21-28. Essentially, drive rollers located beneath product rollers, such as rollers 32 and 33, are replacing slide bar assembly 160. The 3 zones, braking system, and basic construction of the various sections of the disclosed conveyor system remain the same and will not be labeled or discussed in connection with the new drive system. For example, FIG. 21, then, is like FIG. 2, but for the new drive system; FIG. 22 is like FIG. 3, but for the new drive system; and so forth.

In an exit section, 210, the alternative drive roller drive system is identified by numeral 212. One typical drive roller in drive roller system 212 is identified as drive roller 214. In the end section view in FIG. 23, a braking system, 216, remains unchanged. A preferred alternative drive system, 218, is provided for a conveyor belt, 219.

Figure 24:
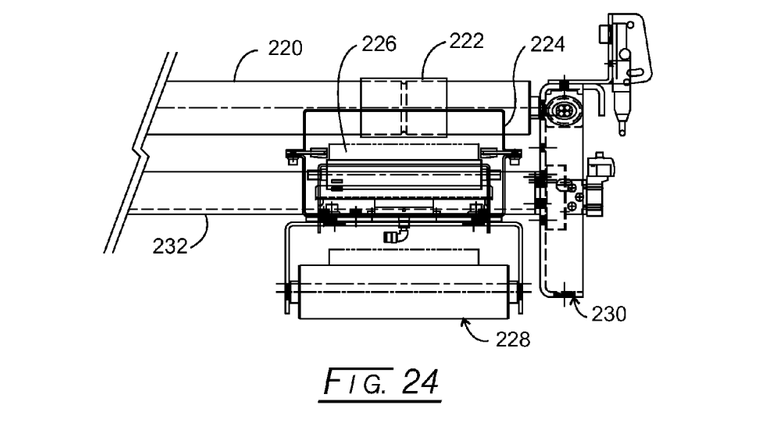
FIG. 24 is an end view of the exit section depicted in FIG. 12 looking from its destination end towards the feed conveyor.

FIG. 24 shows alternative drive system 218 in more detail. A drive roller, 220, is associated with an elastomeric (rubber) sleeve, 222, and has a zone guard, 224, adjacent to it for protection of the operator or other plant personnel. A belt, 226, runs underneath product roller 220 and also runs over a return roller assembly, 228, underneath on its return. A side frame assembly, 230, supports a laterally extending brace, 232.

Figure 25:
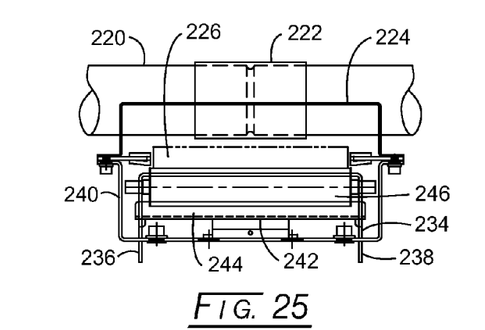
FIG. 25 is a sectional end view showing the alternative drive system carried by the drive section of the feed conveyor of FIG. 21 with the alternative drive system not engaged.

Referring to FIG. 25, underneath, drive roller 226 is an inverted open-ended cover, 234, having end tangs, 236 and 238, that penetrate though a lower holder, 240, that mates with a zone guard, 224, that encases the drive assembly. Both sets of tangs move up and down with the inflation/deflation of a bladder, 242, and hold this assembly in place. Inflatable/deflatable bladder 242 is in contact with an overhead support brace, 244, which in turn is in contact with another overhead support brace, 246, which is disposed beneath driver roller 226.

Figure 26:
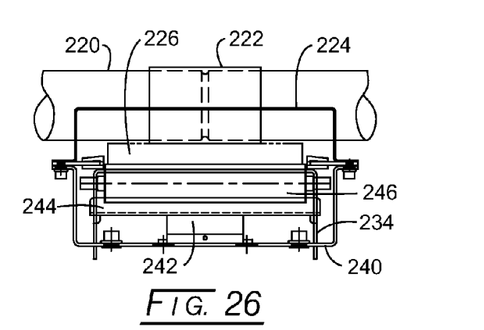
FIG. 26 is a sectional end view showing the alternative drive system carried by the drive section of the feed conveyor of FIG. 21 with the alternative drive system engaged.

When bladder 242 is inflated, as in FIG. 26, it pushes against braces 244 and 246, which in turn pushes against power roller 226, which pinches conveyor belt 219 between drive roller 226 and product roller 250, or more specifically, pinches conveyor belt 219 between drive roller 226 and elastomeric sleeve 222 on product roller 250. Movement of conveyor belt 219 in turn provides motion to product roller 220 and in turn product being conveyed on the product rollers. Of course a series of such alternative drive roller assemblies are disposed along the length of each zone to move product independently in each zone, such as is described above.

Figure 27:
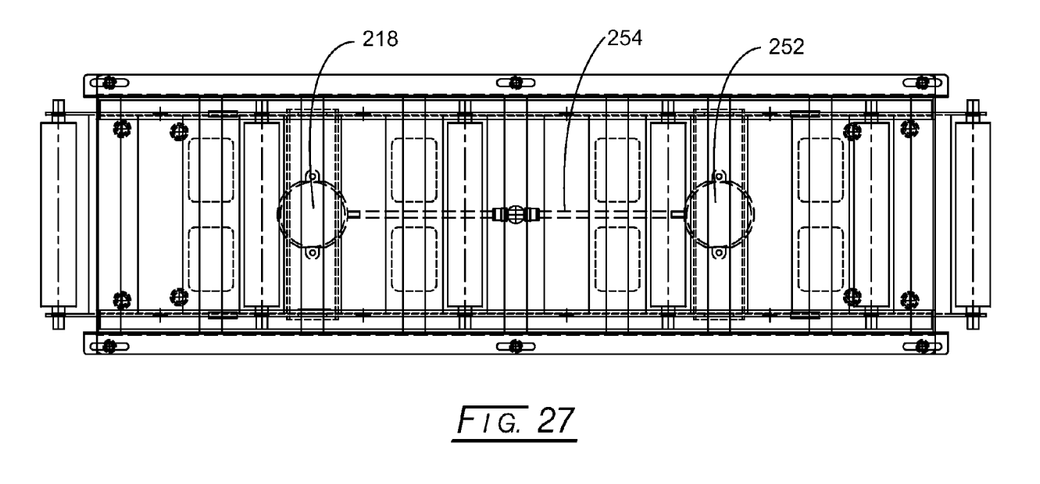
FIG. 27 is an overhead view of the drive system of FIG. 25 showing more of its detailed construction.
Figure 28:
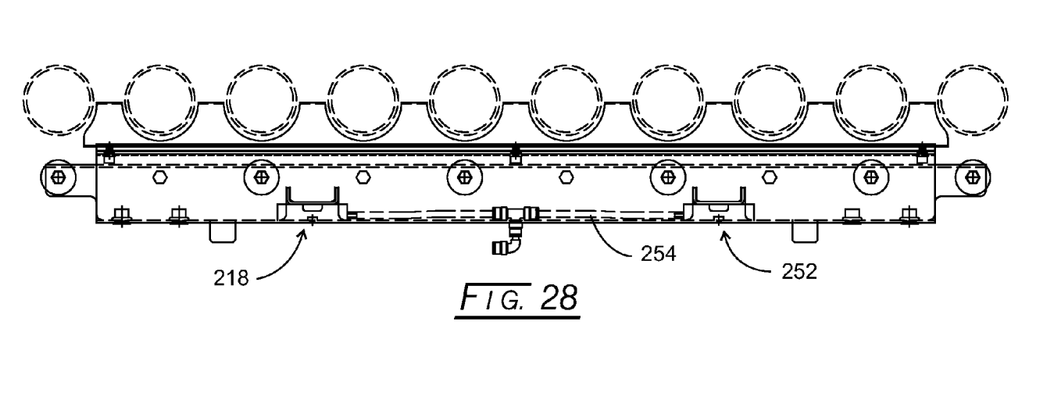
FIG. 28 is a side view of the drive system of FIG. 27.

As seen in FIG. 27, drive system 218 and a second drive system, 252. Note that a hose, 254, connects both drive assemblies so that they operate in unison. The number of drive systems within each zone can be varied by need or desire.

Finally, it should be pointed out that centering units, bar code readers, and the like, if desired, can be associated with the disclosed conveyor system in number and location, depending upon the needs of the plant and operations required.

While the assembly and components thereof has been described with reference to various embodiments, those skilled in the art will understand that various changes may be made and equivalents may be substituted for elements thereof without departing from the scope and essence of the disclosure. Additionally, many modifications may be made to adapt a particular situation or material to the teachings of the disclosure without departing from the essential scope thereof. Therefore, it is intended that the disclosure may not be limited to the particular embodiments disclosed, but that the disclosure will include all embodiments falling within the scope of the appended claims. In this application the US measurement system is used, unless otherwise expressly indicated. Also, all citations referred to herein are expressly incorporated herein by reference.

I claim:

1. In a conveyor assembly including a series of freely moving conveyor rollers for conveying a product to one or more product operations, the improvement which comprises:
    (a) a pair of spaced apart side frames that support the series of freely moving conveyor rollers spanning between said side frames;
    (b) a drive system associated with one or more drive rollers selected from said freely moving conveyor rollers and comprising:
        (1) a selectively inflatable bladder, an elastomeric sleeve wrapped around said drive rollers, and a moving belt disposed beneath said drive rollers, wherein inflation of said bladder pushes said moving belt against said elastomeric sleeve wrapped drive rollers for rotation of said drive rollers; and
    (c) a brake system associated with one or more brake rollers selected from said freely moving conveyor rollers and comprising:
        (1) a selectively inflatable bladder and a fixed elastomeric band disposed beneath said brake rollers, wherein inflation of said bladder pushes said fixed elastomeric band against said brake rollers for stopping rotation of said brake rollers.

2. The conveyor assembly of claim 1, wherein said product is one or more of unmounted tires, wheel mounted tires, green tires, or boxes.

3. The conveyor assembly of claim 1, wherein one series of rollers is an entrance zone for product input to said conveyor assembly, a second series of rollers is an exit zone for product discharge from said conveyor assembly, and a third series of rollers is a drive zone for product accumulation.

4. The conveyor assembly of claim 3, wherein each of said zones had its own drive system and its own brake system.

5. The conveyor assembly of claim 4, wherein each said drive system and each said brake system independently operate.

6. The conveyor assembly of claim 3, which has a plurality of said drive zones.

7. The conveyor assembly of claim 3, wherein the same moving belt is associated with all of said zones.

8. The conveyor assembly of claim 1, wherein a guard is disposed between a side rail and said rollers.

9. The conveyor assembly of claim 1, wherein sensors are located along side conveyor assembly for sensing product.

10. The conveyor assembly of claim 1, wherein in said drive system, a slide bar assembly is disposed between said selectively inflatable bladder and said moving belt, wherein inflation of said inflatable bladder pushes said slide bar assembly against said moving belt for moving of said drive rollers.

11. The conveyor assembly of claim 1, wherein in said drive system, a freely moving power roller is disposed between said selectively inflatable bladder and said moving belt, wherein inflation of said inflatable bladder pushes said drive roller against said moving belt for moving of said drive rollers.

12. The conveyor assembly of claim 3, wherein said exit zone is in communication with a destination conveyor.

13. The conveyor assembly of claim 3, wherein product movement in entrance zone, said exit zone, and said drive zone are independently controlled.

14. The conveyor assembly of claim 3, wherein a controller is associated with each of said zones.

15. The conveyor assembly of claim 1, wherein said bladders are pneumatically inflated with a pneumatic assembly.

\* \* \* \* \*